US 6,671,720 B1

(12) United States Patent
Cheston et al.

(10) Patent No.: US 6,671,720 B1
(45) Date of Patent: Dec. 30, 2003

(54) DATA PROCESSING SYSTEM AND METHOD FOR DYNAMICALLY ASSIGNING A TEMPORARY NETWORK ADDRESS TO A CLIENT COMPUTER SYSTEM UTILIZING AN ACCESS PORT

(75) Inventors: Richard W. Cheston, Morrisville, NC (US); Daryl Carvis Cromer, Apex, NC (US); Dhruv Manmohandas Desai, Cary, NC (US); Howard Jeffery Locker, Cary, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/516,429

(22) Filed: Mar. 1, 2000

(51) Int. Cl.⁷ .................. G06F 15/177; G06F 15/173; G06F 15/16; G06F 9/00
(52) U.S. Cl. ............... 709/222; 709/226; 709/229; 709/245; 713/100; 713/1
(58) Field of Search ................. 709/203, 220, 709/221, 222, 226, 229, 245

(56) References Cited

U.S. PATENT DOCUMENTS

| 5,539,881 A | 7/1996 | Hunt et al. |
| 5,619,650 A | 4/1997 | Bach et al. |
| 5,710,908 A | 1/1998 | Man |
| 5,732,213 A | 3/1998 | Gessel et al. |
| 5,812,819 A * | 9/1998 | Rodwin et al. ............. 395/500 |
| 5,875,306 A | 2/1999 | Bereiter |
| 6,118,768 A * | 9/2000 | Bhatia et al. ............... 370/254 |
| 6,128,664 A * | 10/2000 | Yanagidate et al. ......... 709/228 |
| 6,147,986 A * | 11/2000 | Orsic ......................... 370/349 |
| 6,289,377 B1 * | 9/2001 | Lalwaney et al. .......... 709/222 |
| 6,408,339 B1 * | 6/2002 | Wirkestrand ................ 709/245 |
| 6,427,170 B1 * | 7/2002 | Sitaraman et al. .......... 709/226 |
| 6,442,588 B1 * | 8/2002 | Clark et al. ................. 709/203 |
| 6,463,474 B1 * | 10/2002 | Fuh et al. .................... 709/225 |
| 6,466,986 B1 * | 10/2002 | Sawyr et al. ................ 709/245 |

* cited by examiner

Primary Examiner—Dung C. Dinh
Assistant Examiner—Marion Johnson
(74) Attorney, Agent, or Firm—Carlos Munoz-Bustamante; Bracewell & Patterson, LLP

(57) ABSTRACT

A data processing system and method are described for providing a dynamically assigned network address to a client computer system. The data processing system includes a server computer system coupled to the network. An access port is provided which is coupled to the network. The computer system is coupled to the network utilizing the access port. The computer system is then powered on. The computer system requires a network address in order to communicate utilizing the network. The computer system initially has no stored network address each time prior to being powered on. A dynamic network address is provided to the computer system utilizing only the access port each time the computer system is powering on.

11 Claims, 5 Drawing Sheets

DATA PROCESSING SYSTEM AND METHOD FOR DYNAMICALLY ASSIGNING A TEMPORARY NETWORK ADDRESS TO A CLIENT COMPUTER SYSTEM UTILIZING AN ACCESS PORT

BACKGROUND OF THE INVENTION

1. Field of the Invention

The present invention relates in general to data processing systems and, in particular, to a data processing system and method including a client computer system coupled to a server computer system utilizing a network. Still more particularly, the present invention relates to a data processing system and method including a client computer system coupled to a server computer system for arbitrating a unique, temporary network address for the client utilizing only an access port each time the client is powered on.

2. Description of the Related Art

Personal computer systems have attained widespread use for providing computing power to many segments of today's modern society. Personal computer systems can usually be defined as a desk top, floor standing, or portable microcomputer that consists of a system unit having at least one system processor and associated volatile and nonvolatile memory, a display monitor, a keyboard, one or more diskette drives, a fixed disk storage, and an optional printer. One of the distinguishing characteristics of these systems is the use of a motherboard (also known as a system board, system planar, or planar) to electronically connect these components together. These systems are designed primarily to give independent computing power to a single user and are inexpensively priced for purchase by individuals or small businesses. Examples of such personal computer systems are IBM's Intellistation and IBM's PC 300 PL and PC 300 GL.

Typically, in a business environment, many computer systems are distributed throughout various locations within the physical facilities. Keeping track of the physical location of each computer system is difficult. The difficulty in maintaining an accurate record of each computer system's current physical location greatly increases as the number of computer systems increases. Contributing to this problem is the likelihood that at least some of these computer systems will be moved from one location to another location.

Significant costs are associated with asset tracking of computer systems in a large business environment. Manually locating and inventorying each individual system is typically the method used.

In some known systems, each computer system initially includes a static network address. These are fixed addresses which are not associated with the physical location of the computer systems.

There are many disadvantages to fixed addressing. In a system using fixed addresses, each computer system is assigned a fixed network address even though the computer system may not be currently coupled to the network. Therefore, it is often unclear how many computer systems are currently running on the network at any one time.

Today, many corporations use Dynamic Host Configuration Protocol (DHCP) addressing to dynamically assign unique addresses to each computer system on a network. Dynamic addressing simplifies network administration because the software keeps track of the Internet Protocol (IP) addresses rather than requiring an administrator to manage the task. A new computer can be added to a network without the need to manually assign it a unique IP address. A unique, dynamic address for a client is arbitrated with the server each time the client is coupled to the network.

There are, however, several disadvantages to DHCP. DHCP generates overhead on the network because every computer needs to arbitrate a unique address every time the computer powers on. The time required for the server to assign an address depends upon the number of systems requesting addresses. For example, users may experience a long delay in the morning when many machines are simultaneously requesting addresses.

One solution to these problems has been to arbitrate an address utilizing DHCP only once during the initial installation of the system. Thereafter, when the computer system is powered on, the address assigned during the initial installation is used as a static address. This solution, however, does not support mobile users, or the movement of a computer from one physical location to another.

Therefore, a need exists for a data processing system and method for arbitrating a unique, temporary network address for the system each time the system is powered on without degrading the performance of the network.

SUMMARY OF THE INVENTION

A data processing system and method are described for providing a dynamically assigned network address to a client computer system utilizing an access port. The data processing system includes a server computer system coupled to the network. An access port is provided which is coupled to the network. The computer system is coupled to the network utilizing the access port. The computer system is then powered on. The computer system requires a network address in order to communicate utilizing the network. The computer system initially has no stored network address each time prior to being powered on. A dynamic network address is provided to the computer system utilizing only the access port each time the computer system is powering on.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–5 of the drawings, like numerals being used for like and corresponding parts of the accompanying drawings.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts and not as limiting upon the present invention.

The present invention is a data processing system and method for providing a dynamically assigned network address utilizing an access port to a client computer system each time the client is powered on. The client computer system is coupled to a network utilizing the access port. The data processing system also includes a server computer system coupled to the network. The client computer system requires a network address in order to communicate to other computer systems utilizing the network. Each time prior to the client computer system being powered on, the client has no network address. Therefore, the client computer system has no fixed, static network address.

Each time the computer system is powered on, the computer system requests a network address. The access port snoops all traffic between the client computer system and the network. The access port intercepts the request from the client computer system for a network address. The access port then provides a network address to the client computer system. The access port, therefore, acts as a DHCP server to the computer for the sole purpose of assigning a network address. In this manner, the client computer system receives a dynamically assigned network address each time the client is powered on.

The access port includes a network address stored in its storage location. The access port then provides this stored network address to the client computer system requesting an address.

The present invention provides the benefits of dynamic addressing without generating the overhead associated with dynamic addressing.

Figure 1:
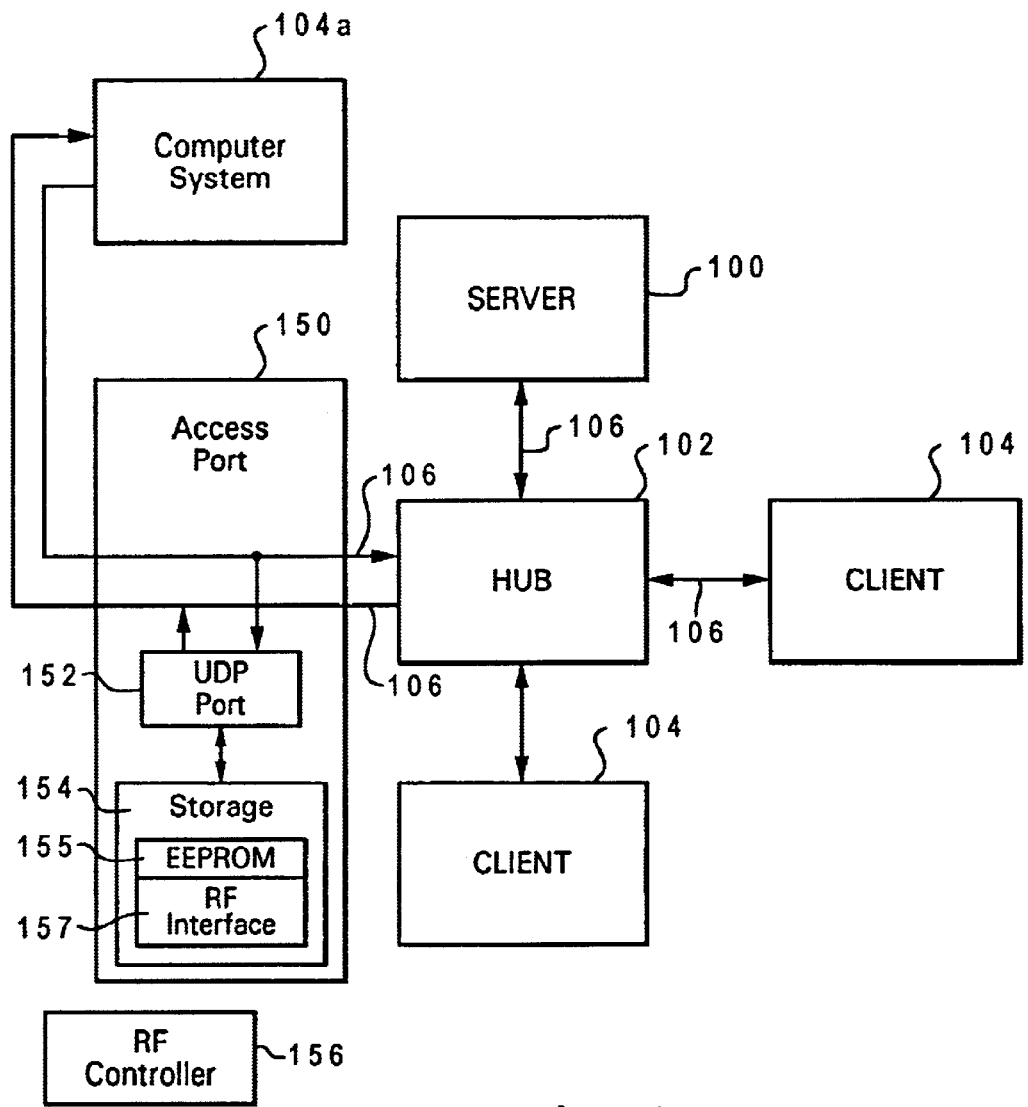
FIG. 1 depicts a pictorial representation of a data processing system including an access port for coupling a client computer system to a network which includes a server computer system in accordance with the method and system of the present invention.

FIG. 1 depicts a pictorial representation of a data processing system including an access port 150 for coupling a client computer system 104a to a network which includes a server computer system 100 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks, such as token ring, may be utilized to implement the invention.

One of the client computer systems 104a is included and is coupled to the network utilizing an access port 150. Access port 150 includes a UDP port 152 and a storage device 154.

Storage device 154 is utilized to store one or more network addresses. Storage device 154 includes a EEPROM 155 for storing a network address, and a radio frequency interface 157 for receiving radio frequency (RF) signals. A network address may be downloaded into access port via bus 106, or via radio frequency signals produced utilizing an RF controller 156.

Figure 2:
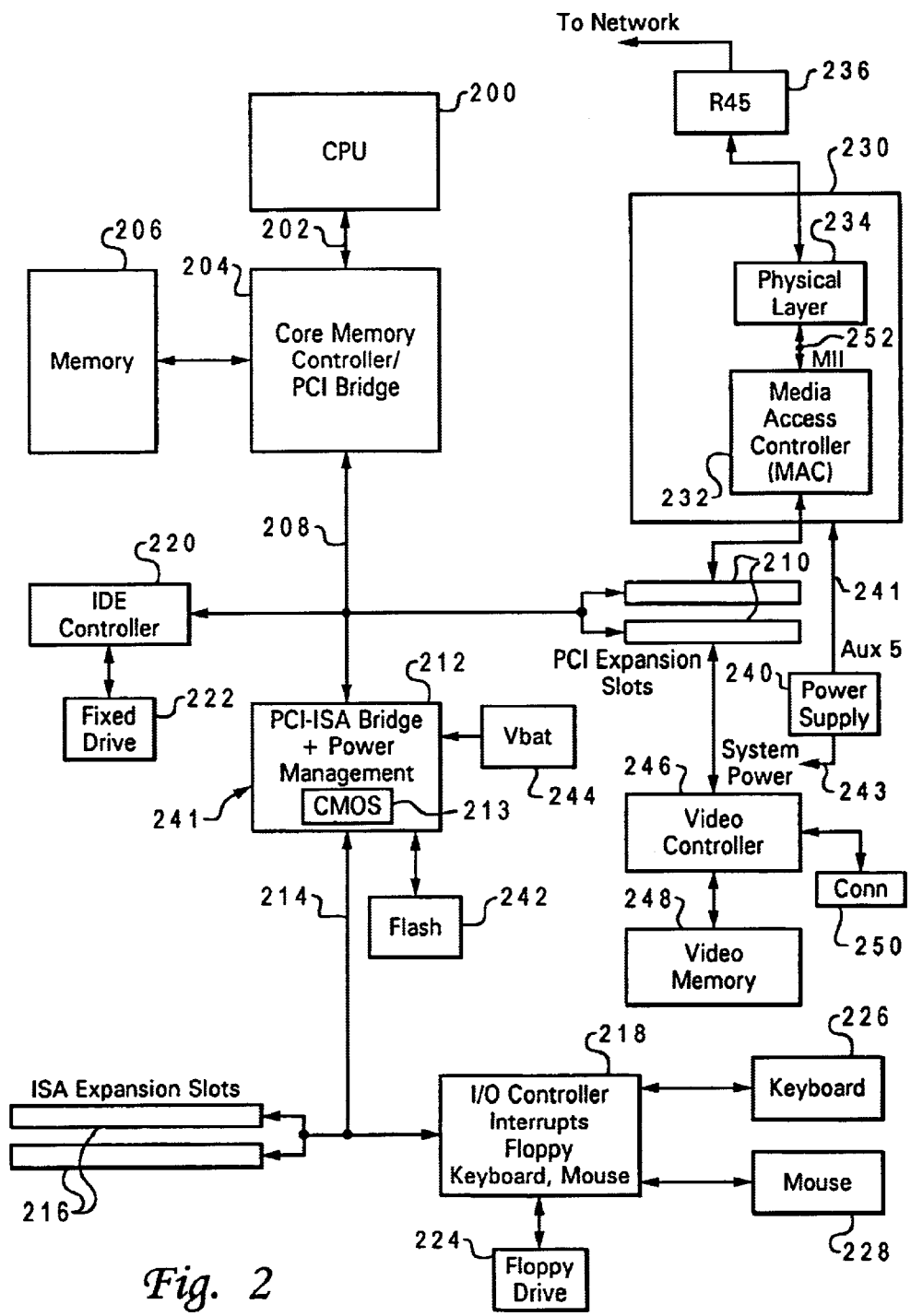
FIG. 2 illustrates a pictorial representation of a computer system which may be utilized to implement a server or client computer system described in FIG. 1 in no accordance with the method and system of the present invention.

FIG. 2 illustrates a pictorial representation of a computer system which may be utilized to implement a server or client computer system described in FIG. 1 in accordance with the method and system of the present invention. Client computer system 104a includes a planar (also commonly called a motherboard or system board) which is mounted within client computer 104a and provides a means for mounting and electrically interconnecting various components of computer 104a including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 204 are connected to PCI bus bridge 204 utilizing PCI bus 208. IDE controller 220 provides for the attachment of IDE compatible storage devices, such a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer system 104a includes a video controller 246 which may, for example, be plugged into one of PCI expansion slots 210. Video controller 246 is connected to video memory 248. The image in video memory 248 is read by controller 246 and displayed on a monitor (not shown) which is connected to computer system 104a through connector 250.

Computer system 104a includes a power supply 240 which supplies full normal system power 243, and has an auxiliary power main AUX 5 241 which supplies full time power to the power management logic 212.

Computer system 104a also includes a network adapter 230. Network adapter 230 includes a physical layer 234 and a media access controller (MAC) 232 coupled together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234. Network adapter 230 may be plugged into one of the PCI connector slots 210 (as illustrated) or one of the ISA connector slots 216 in order to permit computer 104a to communicate with server 100 utilizing communication link 106.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mbps CSMA/CD Ethernet applications. Physical layer 234 receives parallel data from the MII local bus 252 and converts it to serial data for transmission through connector 236 and over a network. Physical layer 234 is also responsible for wave shaping and provides analog voltages to the network. In a preferred embodiment, physical layer 234 is implemented utilizing an Integrated Services chip ICS-1890.

Figure 3:
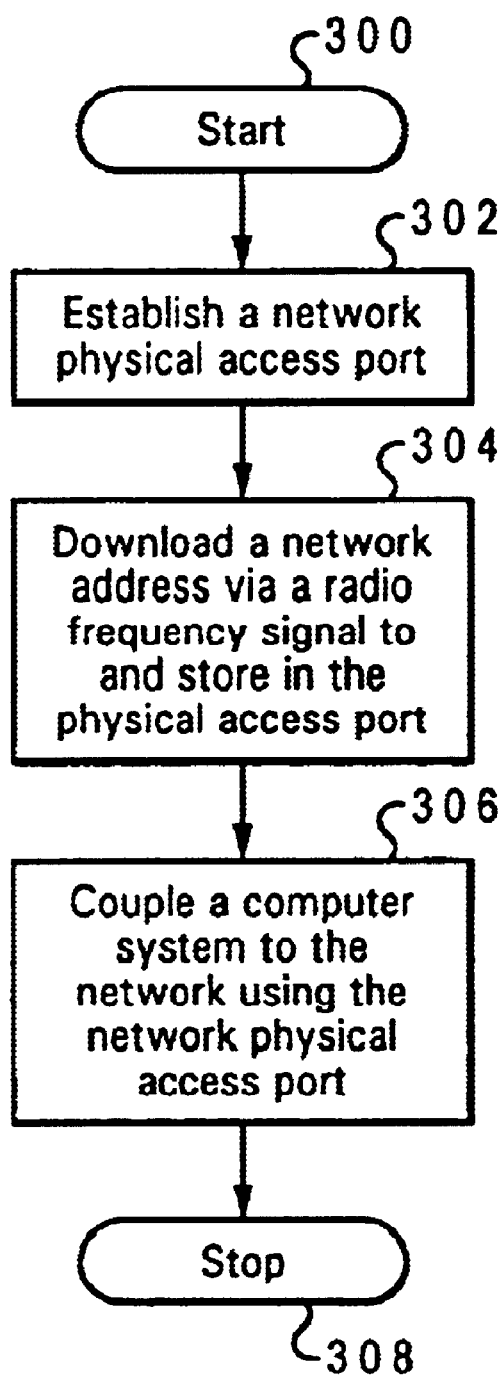
FIG. 3 depicts a high level flow chart which illustrates establishing a network physical access port having storage for storing a network address in accordance with the method and system of the present invention.

FIG. 3 depicts a high level flow chart which illustrates establishing a network physical access port having storage for storing a network address in accordance with the method and system of the present invention. The process starts as depicted at block 300 and thereafter passes to block 302 which illustrates establishing a network physical access port. Next, block 304 depicts downloading a network address to the network physical access port utilizing a radio frequency signal, and the storage of the address in the access port. The network address may be downloaded utilizing a radio frequency controller 156. Block 306, then, illustrates coupling a computer system to the network using the network physical access port. The process then terminates as depicted at block 308.

Figure 4:
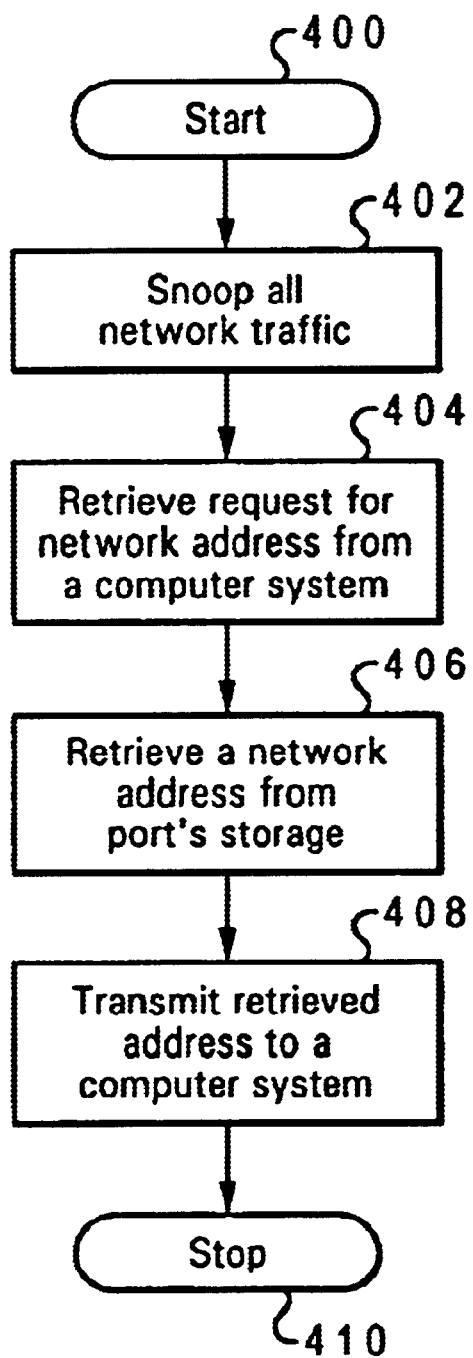
FIG. 4 illustrates a high level flow chart which depicts a network physical access port retrieving a request for a network address from a computer system, and a transmission of the address to the computer system in accordance with the method and system of the present invention.

FIG. 4 illustrates a high level flow chart which depicts a network physical access port retrieving a request for a network address from a computer system, and a transmission of the address to the computer system in accordance with the method and system of the present invention. The process starts as depicted at block 400 and thereafter passes to block 402 which illustrates a network physical access port snooping all network traffic on connector bus 106. Next, block 404 depicts the retrieval of a request from the network for a network address for a computer system. The process then passes to block 406 which illustrates the network physical access port retrieving a network address from the access port's storage. Thereafter, block 408 depicts the access port transmitting the retrieved network address to the requesting computer system. The process then terminates as illustrated at block 410.

Figure 5:
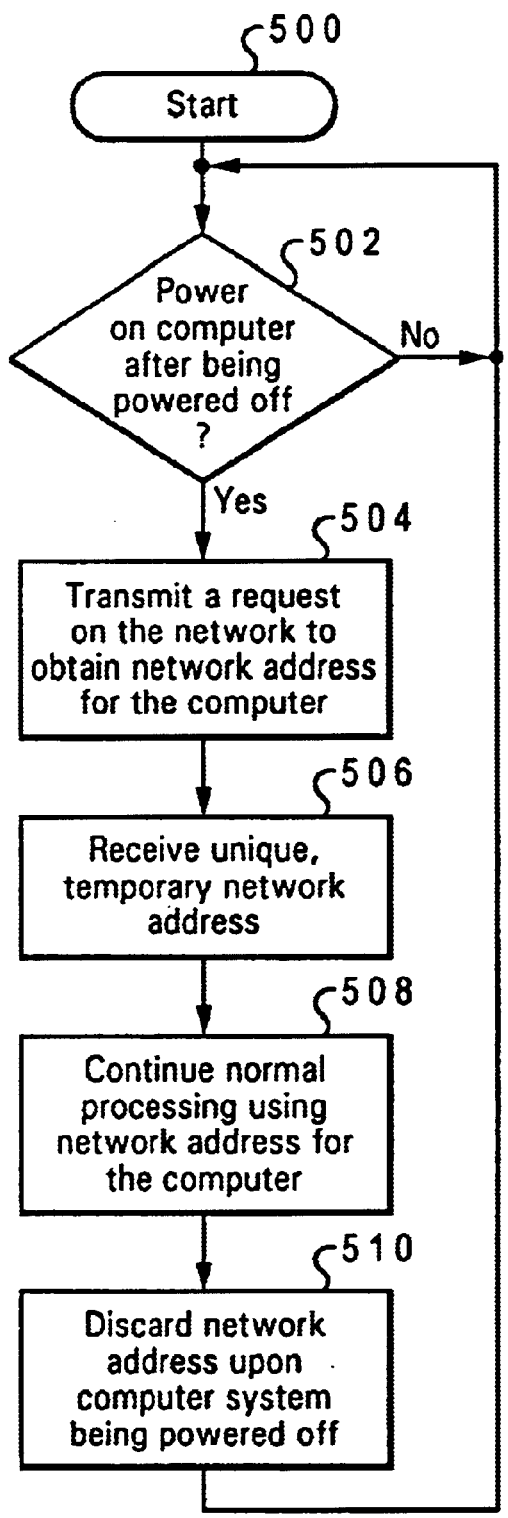
FIG. 5 depicts a high level flow chart which illustrates a computer system receiving and utilizing a dynamic network address in accordance with the method and system of the present invention.

FIG. 5 depicts a high level flow chart which illustrates a computer system receiving and utilizing a dynamic network address in accordance with the method and system of the present invention. The process starts as depicted at block 500 and thereafter passes to block 502 which illustrates a determination of whether or not the computer system is powered on after being powered off. If a determination is made that the computer system has not been powered on after the computer had been off, the process then passes back to block 502. If a determination is made that the computer system has been powered on after the computer had been off, the process passes to block 504 which depicts the computer system transmitting a request on the network to obtain a network address for the computer system. When the computer system is powered on, the computer system does not have a network address, i.e. the computer system does not have a fixed network address.

The process then passes to block 506 which illustrates the computer system receiving a unique, temporary network address. Next, block 508 depicts the computer continuing normal processing using the received network address as the A network address for the computer system. Thereafter, block 510 illustrates the computer system discarding the received network address when the computer system is powered off. The process then passes back to block 502.

While a preferred embodiment has been particularly shown and described, it will be understood by those skilled in the art that various changes in form and detail may be made therein without departing from the spirit and scope of the present invention.

What is claimed is:

1. A method in a data processing system for providing a dynamically assigned network address to a client computer system, said data processing system including a server computer system coupled to a network, said method comprising the steps of:

providing an access port coupled to a network;

coupling a client computer system to said network utilizing said access port;

assigning a unique dynamic network address to said access port;

storing said unique dynamic network address in a non-volatile memory in said access port;

cycling power on to said computer system, said computer system requiring a network address in order to communicate utilizing said network, and said computer system initially having no stored network address each time prior to being powered on;

providing said unique dynamic network address stored in said access port to said client computer system utilizing only said access port each time said client computer system is powered on; and snooping network traffic utilizing said access port transmitted between said client computer system and said server computer to determine if said client computer system requires said unique dynamic network address to respond to a device on said network.

2. The method according to claim 1, further comprising the step of determining a physical location for said client computer system utilizing said unique dynamic network address.

3. The method according to claim 1, further comprising the step of downloading said unique dynamic network address to a memory in said access port from said server computer system.

4. The method according to claim 1, further comprising the step of retrieving said request from said network utilizing said access port while said access port is snooping said network traffic.

5. The method according to claim 4, further comprising the step of transmitting said network address to said computer system utilizing said access port in response to said access port retrieving said request.

6. A data processing system for providing a dynamically assigned network address to a client computer system, said data processing system including a server computer system coupled to a network, comprising:

an access port coupled to a network;

a client computer system coupled to said access port;

means for assigning a unique dynamic network address to said access port;

means for storing said unique dynamic network address in a non-volatile memory in said access port.

means for cycling power on to said computer system, said computer system requiring a network address in order to communicate utilizing said network, and said computer system initially having no stored network address each time prior to being powered on;

means for providing said unique dynamic network address stored in said non-volatile memory in said access port to said client computer system utilizing only said access port each time said client computer system is powered on; and means for snooping network traffic utilizing said access port transmitted between said client computer system and said server computer to determine if said client computer system requires said unique dynamic network address to respond to a device on said network.

7. The system according to claim 6, further comprising means for utilizing said unique dynamic network address to determine a physical location for said client computer system.

8. The system according to claim 6, further comprising said server computer system for downloading said unique dynamic network address to said access port.

9. The system according to claim 6, further comprising said access port for retrieving said request from said network while said access port is snooping said network traffic.

10. The system according to claim 9, further comprising said access port for transmitting said network address to said computer system in response to said access port retrieving said request.

11. A system for providing a dynamic network address to a client computer on a network, said system comprising:

an access port connecting a server and a client computer on a network, said access port including a User Database Protocol (UDP) port and a non-volatile storage, said UDP port providing means for communicating between said access port and said server, said non-volatile storage storing a unique dynamic network address for said access port, wherein said client computer is assigned said unique dynamic network address by said access port when said client computer powers up; and means or snooping network traffic utilizing said access port transmitted between said client computer and said server to determine if said client computer requires said unique dynamic network address to respond to a device on said network.

* * * * *